(12) United States Patent
Vahid et al.

(10) Patent No.: US 11,929,664 B2
(45) Date of Patent: Mar. 12, 2024

(54) MULTI-PORT POWER CONVERTER (71) Applicant: Marquette University, Milwaukee, WI (US)

(72) Inventors: Sina Vahid, Milwaukee, WI (US); Ayman Mohamed Fawzi El-Refaie, Pewaukee, WI (US)

(73) Assignee: Marquette University, Milwaukee, WI (US)

( * ) Notice: Subject to any disclaimer, the term of this patent is extended or adjusted under 35 U.S.C. 154(b) by 77 days.

(21) Appl. No.: 17/788,460

(22) PCT Filed: Dec. 21, 2020

(86) PCT No.: PCT/US2020/066349
§ 371 (c)(1),
(2) Date: Jun. 23, 2022

(87) PCT Pub. No.: WO2021/133718
PCT Pub. Date: Jul. 1, 2021

(65) Prior Publication Data
US 2023/0023934 A1    Jan. 26, 2023

Related U.S. Application Data

(60) Provisional application No. 62/952,679, filed on Dec. 23, 2019.

(51) Int. Cl.
*H02M 1/00* (2006.01)
*H02J 3/00* (2006.01)
(Continued)

(52) U.S. Cl.
CPC ........... *H02M 1/0083* (2021.05); *H02J 3/007* (2020.01); *H02J 3/32* (2013.01); *H02J 3/381* (2013.01);
(Continued)

(58) Field of Classification Search
CPC ........... H02M 1/0083; H02M 3/33573; H02M 3/158; H02M 3/33576; H02M 1/00;
(Continued)

(56) References Cited

U.S. PATENT DOCUMENTS

2008/0238195 A1   10/2008   Shaver et al.
2009/0225569 A1   9/2009    Begalke
(Continued)

FOREIGN PATENT DOCUMENTS

WO    2019199964 A1    10/2019

OTHER PUBLICATIONS

PCT International Search Report and Written Opinion, PCT/US2020/066349, dated Mar. 18, 2021, 13 pages.

*Primary Examiner* — Robert L Deberadinis
(74) *Attorney, Agent, or Firm* — Quarles & Brady LLP (57) ABSTRACT

A multi-port converter includes a hybrid energy storage system (HESS) that provides a faster dynamic response to load changes than prior art systems, and enables either downsizing of the main energy storage system (ESS) to increase the life of the main ESS (e.g. energy battery), or retaining the same size ESS and increasing the range or life of the power source. The multi-port convertor can advantageously result in lower investment and maintenance costs, and can also advantageously provide a path for inputs to directly feed the load. All these benefits can be achieved while reducing the number of active switches and overall component count as compared to prior art systems.

21 Claims, 10 Drawing Sheets

(51) Int. Cl.
  *H02J 3/32* (2006.01)
  *H02J 3/38* (2006.01)
  *H02J 7/00* (2006.01)
  *H02J 7/34* (2006.01)
  *H02M 3/158* (2006.01)
  *H02M 3/335* (2006.01)

(52) U.S. Cl.
  CPC ............ *H02J 7/0048* (2020.01); *H02J 7/345* (2013.01); *H02M 3/158* (2013.01); *H02M 3/33573* (2021.05); *H02M 3/33576* (2013.01); *H02J 2300/24* (2020.01); *H02J 2300/30* (2020.01)

(58) Field of Classification Search
  CPC ........ H02M 3/335; H02J 3/0048; H02J 3/007; H02J 3/32; H02J 3/381; H02J 7/345; H02J 2300/24; H02J 2300/30; H02J 7/00; H02J 3/00; H02J 3/38; H02J 7/34
  See application file for complete search history.

(56) References Cited

U.S. PATENT DOCUMENTS

2010/0320837 A1* 12/2010 Harrison .................. H02J 1/04
                                                                 307/26
2014/0070611 A1    3/2014 Fernandez et al.

* cited by examiner

MULTI-PORT POWER CONVERTER

CROSS-REFERENCE TO RELATED PATENT APPLICATIONS

The present application represents the U.S. national stage entry of International Application No. PCT/US2020/066349 filed Dec. 21, 2020, which claims the benefit of priority to U.S. Provisional Patent Application No. 62/952,679, filed Dec. 23, 2019, the contents of which are incorporated herein by reference in its entirety.

BACKGROUND

Renewable energy sources (RESs), such as photovoltaic and wind systems, are increasingly important in electrical grids and transportation systems to reduce or stabilize greenhouse gas emissions and concentrations, and to limit the effects of climate change. Although RESs are advantageous to the climate, there are a number of known disadvantages with renewable and hybrid power systems. RESs, for example, can operate intermittently. RESs, therefore, are often applied in combination with energy storage systems (ESSs).

Figure 5:
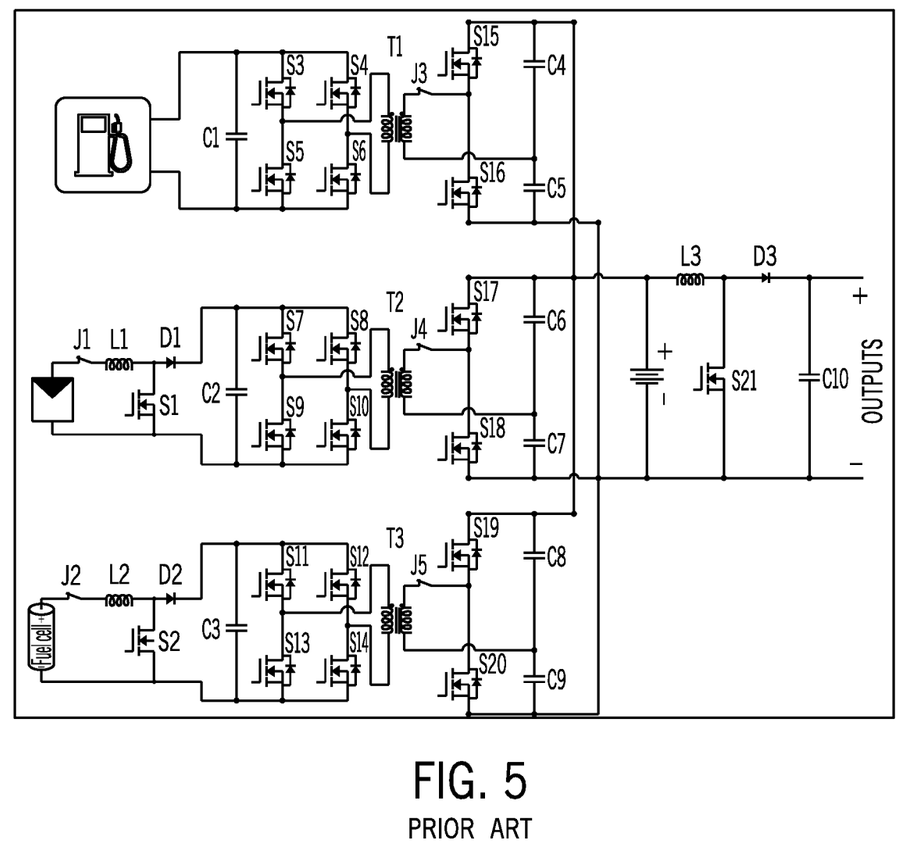
FIG. 5 is a schematic of a prior art multi-port convertor.

Multi-port convertors that combine RESs and ESSs, therefore, are known in the art for use in applications such as residential photovoltaic systems, satellites, and electric vehicles. A topology for a typical prior art multi-port convertor is illustrated in FIG. 5. As illustrated here, the prior art multi-port convertor includes 3 separate input ports which can be connected to different power supply sources, including an AC power grid, photovoltaic, and fuel cell, and which is then processed separately. When a power supply produces AC power, the power is converted to DC using known technology. The DC power from all ports is then converted to AC pulses using inverter technology, here illustrated as an H-bridge inverter circuit. The output of each individual stage is then fed to a transformer, each transformer having a primary winding and two secondary windings. The output of each secondary winding is rectified through a half bridge converter. The output of a first secondary winding from each input is fed to a battery storage system, and the output of a second secondary winding is connected through a switch to either supply output directly to an output line or to a super capacitor. The switches and relays are driven by individual controllers associated with the circuit (not shown). Although three specific power supply inputs are illustrated here, any number of inputs can be used, and the input power supplies can be many different kinds.

While topologies for multi-port convertors are therefore available and known in the art, these topologies suffer from disadvantages, particularly when applied in applications such as traction in electrical vehicles and aerospace applications. For example, these prior art topologies require a large number of components and can therefore also be fairly large in size, and/or limited in range when applied to motive vehicles. Because of the size and complexity, these prior art devices are also expensive, and suffer from slow response times. For example, because the circuits require a number of controllers, response times are further limited due to the need for communications and coordination between the controllers Further, the prior art does not include any multiport system that combines photovoltaic (PV), electrical grid, and fuel cell (FC) sources with a hybrid energy storage system (HESS) while also providing galvanic isolation and performance monitoring.

It is desirable, therefore, to provide a multi-port converter with at least some of the following features: reduced number of switches, improved response time, reduced cost, and improved range. It is further desirable to provide a system that can combine various energy sources at input ports without regard to their characteristics, and that enables an extendable number of input ports.

SUMMARY

The disclosure is directed to multi-port converters suitable for use in applications, including, but not limited to, solar, smart buildings, and traction applications, such as electric vehicles (EV) and aerospace. The disclosed topology includes a hybrid energy storage system (HESS) that provides a faster dynamic response to load changes than prior art systems, and enables either downsizing of the main energy storage system (ESS) to increase the life of the main ESS (e.g. energy battery), or retaining the same size ESS and increasing the range or life of the power source. The disclosed system can advantageously result in lower investment and maintenance costs. The multi-port convertor can also advantageously provide an extra path for inputs to directly feed the load by bypassing the HESS.

The disclosed system provides a unique combination of ESSs which can include different charge and discharge response characteristics. For example, as illustrated below, the ESS can include a battery and a supercapacitor. The potential energy in the battery is stored in a chemical form, while the potential energy of the supercapacitor is stored in an electric field. The chemical storage of the battery has greater energy density, and therefore is capable of storing more energy per weight than a supercapacitor. Discharging of the battery, however, can be slower than discharging a supercapacitor because of a latency associated with the chemical reaction to transfer the chemical energy into electrical energy. A supercapacitor is storing the electrical energy directly, and can discharge and charge faster than a battery. By utilizing multiple types of energy storage devices, and providing separate charging paths onboard the circuit, the disclosed system can consistently provide energy to a load and supplement the energy supply quickly when necessary.

In one aspect of the disclosure, a multiport convertor is disclosed. The multiport convertor includes a direct current (DC) processing circuit including an inverter for converting input power to an alternating current (AC) pulse train; a plurality of power sources, at least one of the plurality of power sources being a renewable energy power source, the plurality of power sources being selectively connectable to an input of the DC processing circuit; and a high frequency transformer having a single primary winding and at least first and second secondary windings, the high frequency transformer connected to receive the AC pulse train. A first and a second rectifier circuit can be selectively connected to the first and second windings, respectively. A first energy storage system is selectively connected to an output of the first rectifier circuit, and a second energy storage system is selectively connected to an output of the second rectifier circuit. A load output is selectively connected to one of the first energy storage system, the second energy storage system, or an output of at least one of the first and second rectifier circuits. A controller is programmed to monitor a power level of each of the plurality of input power sources, a state of charge of the first and second energy storage systems, and a demand at the load output; based on the monitored power level, selectively connect at least one of the plurality of input power sources to the DC processing; based on the state of charge of each of the first energy storage system, selectively connect the first energy storage system to the first rectifier circuit to charge the first energy storage system; based on the state of charge of the second energy storage system, selectively connect the second energy storage system to the second rectifier circuit to charge the second energy storage system; and based on the monitored demand of the load, selectively switch an output of the first energy storage system and/or the second energy storage system, or an output of at least one of the first and second rectifiers, to the load output, wherein power is supplied to the load output by at least one of the first and second energy storage systems or directly from one of the first and second rectifiers.

The power sources of the multi-port convertor can include an AC power grid and a rectifier circuit for rectifying the AC power to DC. The multi-port convertor can also include a fuel cell and a boost circuit operated in a continuous current mode. The plurality of power sources can include a photovoltaic power supply and a flyback convertor, which can provide galvanic isolation for the photovoltaic. One of the input ports can also be connected to a charger.

The multiport first and second energy storage systems can comprise an energy battery, a power battery and/or a super capacitor. One or both of the first and second energy storage systems can further connected to a boost circuit. One of the first and second energy storage systems can be a primary energy storage system that is connected to the output load in a normal mode of operation. The other of the first and second energy storage systems can be a secondary energy storage system, and the controller can be programmed to connect the secondary energy storage system to the output load to supply the demand when monitoring detects a surge in the demand at the output load.

In another aspect, the controller of the multi-port convertor can be programmed to provide power to the output load from at least one of the first and second rectifiers when the state of charge of the first and second energy systems is insufficient to supply the demand at the output load. The controller can also be programmed to monitor environmental conditions, such as temperature levels, and to determine available output power based on the environmental conditions.

In another aspect, the multiport controller can be programmed to simultaneously supply current from at least one of the first and second energy storage systems while charging the other of the first and second energy storage systems. The controller can be programmed to simultaneously supply power to the load from at least one of the first and second energy storage systems and directly from an output of at least one of the first and second rectifier circuits. The controller can be programmed to provide power to the load output from at least one of the first energy storage system, the second energy storage system, and at least one of the first and second rectifier circuits. The controller can be programmed to selectively switch power to the load output solely from one of the first and second rectifier circuits.

In yet another aspect, the first and second energy storage systems can be selected to have different charge and discharge characteristics.

In another aspect, the turns ratio between the primary winding and the first and second secondary windings can be selected to boost the voltage level from the input to match a requirement of each of the first and second energy storage systems. The turns ratio between the primary winding and the first and second secondary windings can also be selected to provide corresponding first and second voltage levels, the first voltage level for charging the first and second energy storage systems, and the second level for supplying voltage to the load output.

These and other aspects of the disclosure will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION

Figure 1:
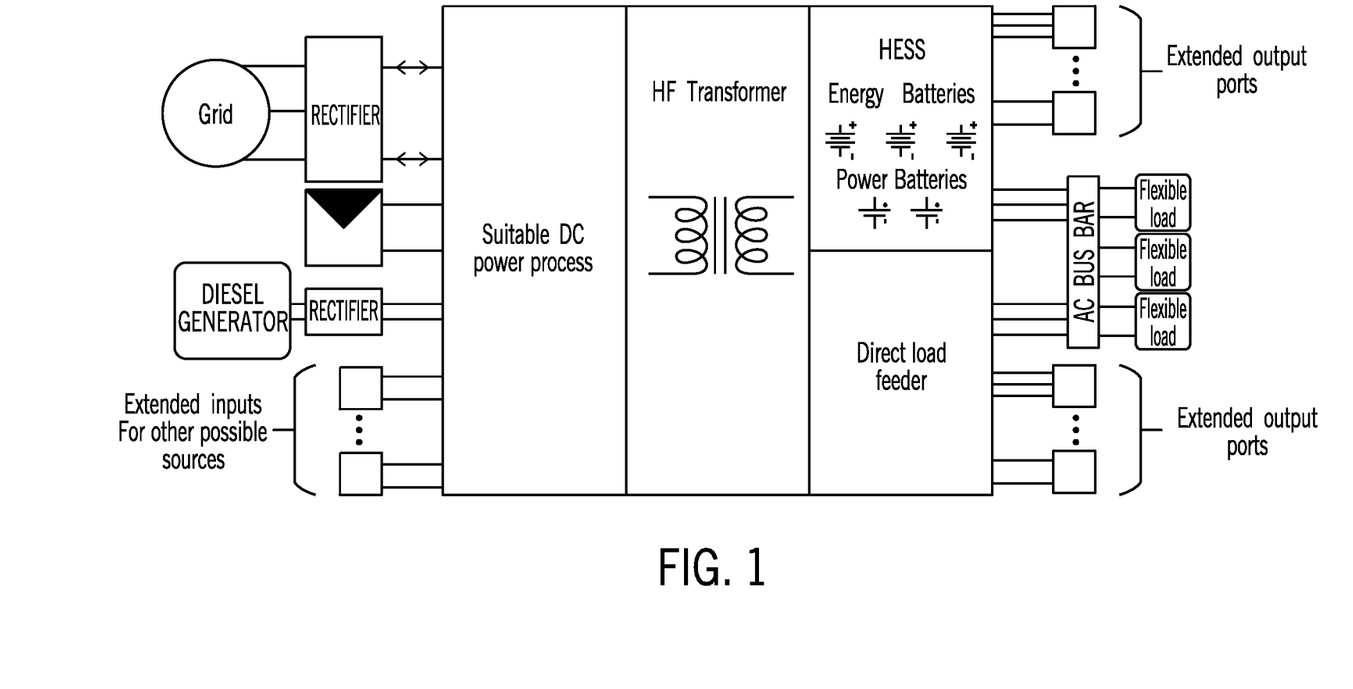
FIG. 1 is a block schematic illustrating a multi-port converter topology constructed in accordance with the disclosure.

Referring now to FIG. 1, a block schematic illustrating a multi-port convertor topology constructed in accordance with the disclosure is shown. The illustrated multi-port converter consists of a plurality of input ports which can be connected to a variety of input power supplies. As illustrated here, from top to bottom, the first input can be, for example, connected to an alternating current (AC) power supply such as the electrical power grid through a rectifier or a battery charger converting the input power to direct current (DC). The second port illustrated here is connected to a diesel generator, again through a rectifier converting the input power to DC. A plurality of additional inputs can be connected to other types of power supplied including, for example, a fuel cell (FC) unit, or a photovoltaic system (PV), as discussed more fully below. The received DC power can be processed in a first step, and then submitted to a high frequency transformer which galvanically isolates the inputs from additional processing and the output ports. As illustrated here, output from the high frequency transformer can be transmitted to the HESS, or fed directly to a load. The HESS topology can include an energy battery, a supercapacitor, a combination of an energy battery and a supercapacitor (SC), or other suitable storage and load leveling elements. When the HESS includes a combination of an energy battery and SC, the SC can be, for example, activated by a controller in case of sudden changes to compensate the load current's surplus and reduce the stress on the battery. Other switches can be employed to selectively switch power supplies in and out of the circuit, and to control the path of power through the circuit.

Figure 2:
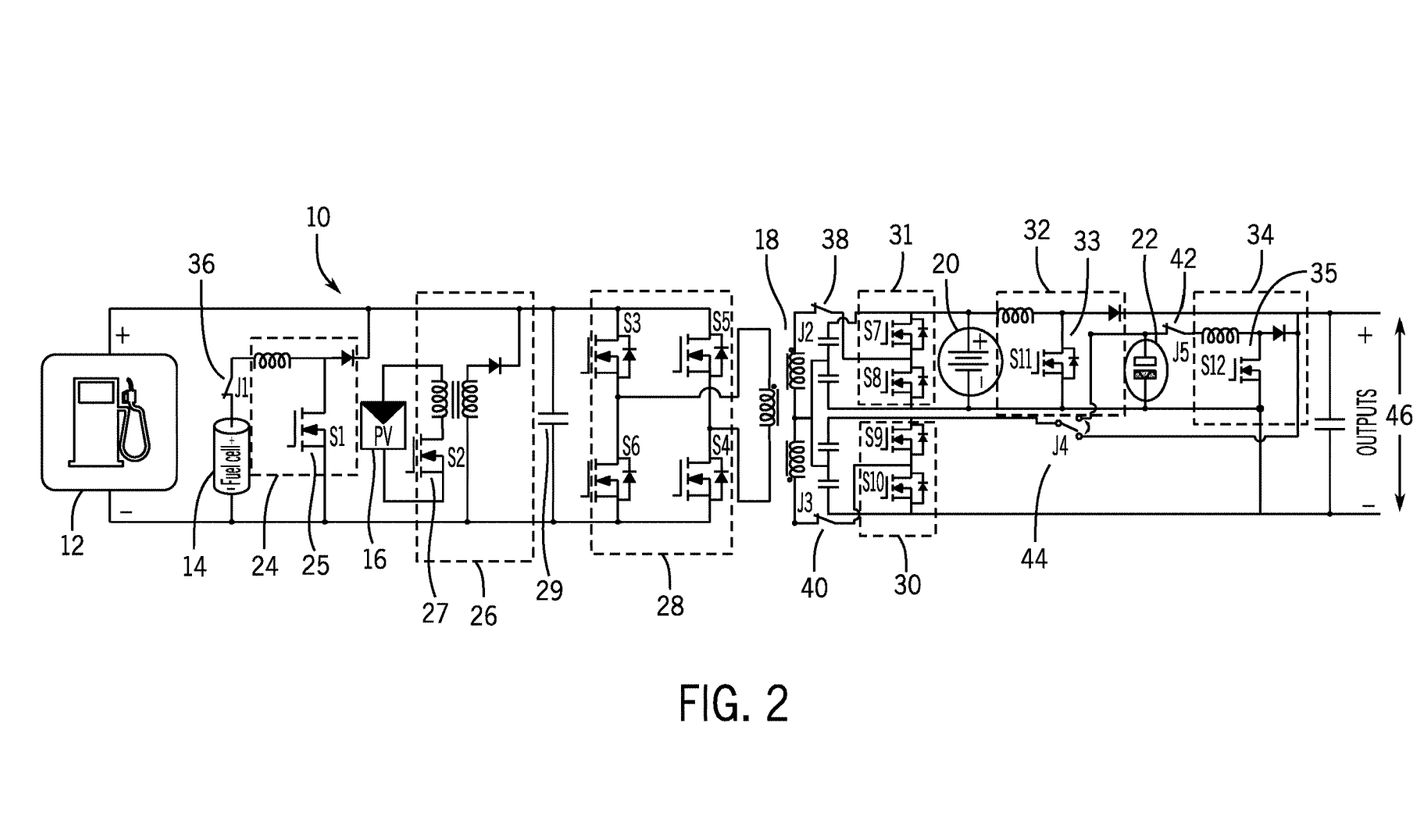
FIG. 2 is a detailed schematic illustrating a multi-port converter topology constructed in accordance with the disclosure.

Referring now to FIG. 2, a detailed schematic illustrating a multi-port convertor topology constructed in accordance with the disclosure is shown. The illustrated multi-port converter 10 consists of three input ports. From left to right, the first input 12 can be connected to an AC power supply or electrical power grid through a rectifier or a battery charger (illustrated here as a fuel tank). This input will be referred to as a charger below to simplify the description. The second port 14 is connected to a fuel cell (FC) unit. The third input 16 is connected to a photovoltaic system (PV). Other power supplies, such as rectified standalone AC power supplies and standalone DC power supplies can also be used.

All these inputs are processed and then galvanically isolated from the HESS and outputs through a high frequency transformer 18, as described more fully below. As described above, in this illustrated topology, HESS includes a combination of an energy-type storage system and a power-type storage system, here illustrated as an energy battery 20 and a supercapacitor (SC) 22 which both can provide power to output 46, which can be, for example, a DC busbar. In operation, the SC 22 can be activated to compensate the load current's surplus and reduce the stress on the battery 20. In this topology at least two different paths, controlled by switching elements, are provided to charge the battery and the SC separately. As described above, harvested power from the input ports can also reach the output 46 without going through the HESS. Harvested power can, for example, be directed to the output 46, bypassing the HESS when there is a malfunction in the battery or other HESS components. Switching elements can also be used to provide additional energy to the load. For example, if the load requires more energy than the battery is presently providing, a controller 50 (FIG. 4A) can switch the supercapacitor 22 into the circuit to provide additional power, as described below.

By merging several single-input single-output (SISO) converters to a multi-input multi-output (MIMO) system, need for communications between the controllers of several converters will be significantly reduced. This feature leads to a faster response from the converter to load changes while minimizing the chance of errors in communication, which can be beneficial in applications such as smart buildings where the cyber security can be important. The other feature of this converter is that the number of inputs, outputs, and ESSs can be increased and selectively switched into and out of the system Referring still to FIG. 2, and now also to FIGS. 3A-3E, functional portions of the converter are shown to illustrate operation of the converter, which will be discussed more fully below.

Figure 3A:
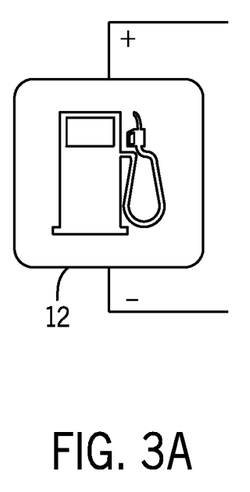
FIG. 3A is a partial schematic illustrating a first input port of FIG. 2.
Figure 3B:
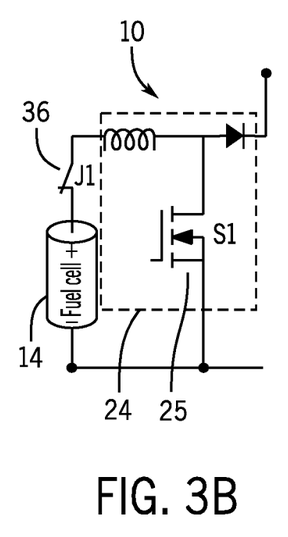
FIG. 3B is a partial schematic illustrating a second input port of FIG. 2.
Figure 3C:
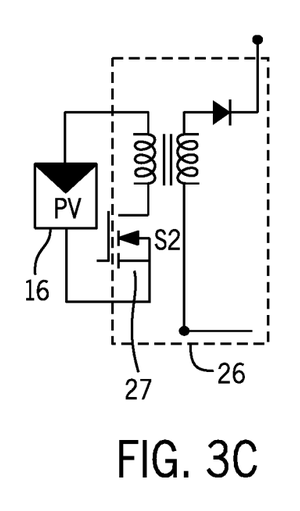
FIG. 3C is a partial schematic illustrating a third input port of FIG. 2.

FIGS. 3A-3C illustrate input ports which, as described above, can be directly connected to a power supply, charger or electric grid. Where the input power supply is an AC power supply, a rectifier can be used. The power supplies attached at the input ports can be used to charge the HESS, or directly feed the load.

Referring still to FIG. 2 and now also to FIG. 3A, a first input port 12 to the convertor is shown. Here, the input port 12 is connected to the electric grid, providing an AC power supply which is rectified to provide a DC power input to the bridge described below with reference to FIG. 3D.

Referring still to FIG. 2 and now also to FIG. 3B, a second input port 14 which is connected to a fuel cell (FC) is illustrated. A unidirectional boost converter 24 that operates in the continuous current mode (CCM) is connected to the FC to provide a smooth current draw from the FC. The switch 25 in the boost converter 24 can be an SiC MOSFET switch which can reduce the size of the inductor which leads to a higher power density for this converter. An input path control switch 36 which can be, for example, a normally open contact driven by a relay, can switch the fuel cell 14 in or out of the circuit by a controller (not shown). In addition to SiC MOSFETS, devices with similar characteristics such as Si MOSFETs, GaN MOSFETs, Si IGBTs and SiC IGBTs can be used.

Referring still to FIG. 2 and now also to FIG. 3C, a third input 16 which connects to photovoltaic sources or solar arrays (PV) is shown. The PV source is connected to a flyback convertor 26, including MOSFET switch 27, which includes a transformer that provides a galvanic isolation between the PV arrays and the rest of the MPC and protects the remainder of the MPC from leakage current from the PV arrays. The flyback converter 26 enables changing the duty ratio of the gate pulse of the MOSFET to increase or decrease the output voltage of the PV. Therefore, without changing this part of the converter, PV systems with both higher or lower voltage levels than what is needed to feed the transformer and the output 46 (FIG. 2) can be used, allowing the user to choose PV arrays with different voltage levels for different applications, and the ability to boost and reduce the input voltage enables users to choose a PV system based on available space rather than the converter's constraints. Like the SiC MOSFET described above with reference to the second input port, the flyback converter 26 increases the power density by reducing the size of the isolation transformer, and other passive components, including inductors and capacitors.

Figure 3D:
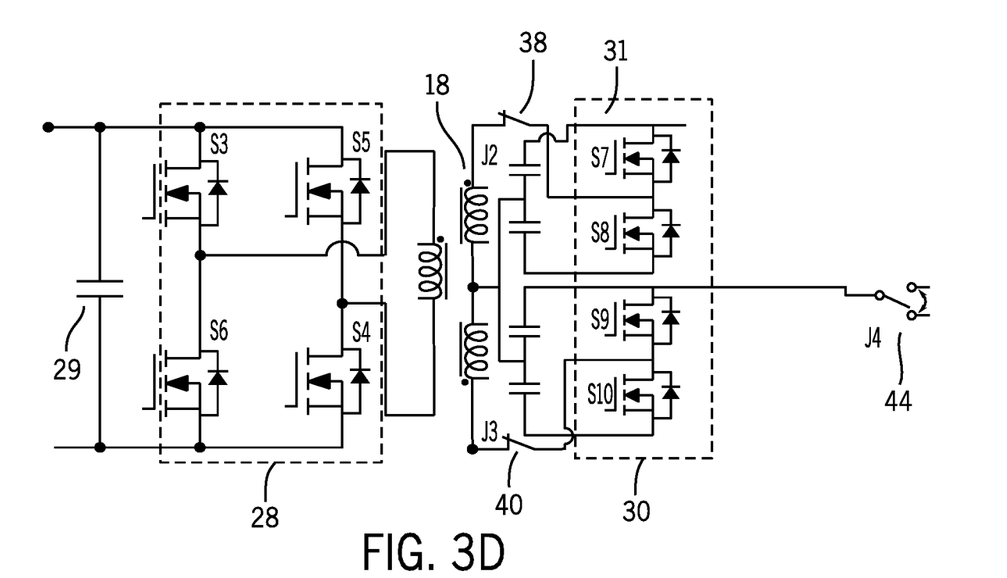
FIG. 3D is a partial schematic illustrating a bridge portion of the circuit of FIG. 2.

Referring still to FIG. 2 and now also to FIG. 3D, a bridge between input and HESS/output is shown, including the DC power processing circuitry and HF transformer 18. In the primary side of the HF transformer 18, harvested power is stored in a primary DC-link capacitor 29 and an H-bridge converter 28 is used as an inverter to convert the DC output to a pulse train, which is supplied to the primary side of the high frequency (HF) transformer 18. GaN switches can be used in the H-bridge to enable increasing the frequency and reducing the size of HF transformer. The HF transformer 18 has one primary winding and two secondary windings, and provides galvanic isolation between the input ports and HESS/output. The galvanic isolation prevents faults at the inputs from affecting the HESS and outputs and vice versa. Moreover, the turns ratio of the transformer winding can boost the voltage level from the input to match the requirements of the HESS and outputs. The secondary outputs can also provide two different voltage levels for charging ESSs and directly feeding the output 46.

The secondary outputs are each rectified by employing a corresponding half-bridge GaN switched converter 30, 31. Here, one of the secondary windings is used to charge the power battery 20 when battery charging path control switch 38 is activated, discussed with reference to FIG. 3E below, while the other secondary winding can either directly feed the load or charge the SC 22, dependent on the position of the super capacitor path control switch 40 and output path control switch 44. The maximum frequency of the inverter 28 can be determined based on the thermal limit of HF transformer 18.

Figure 3E:
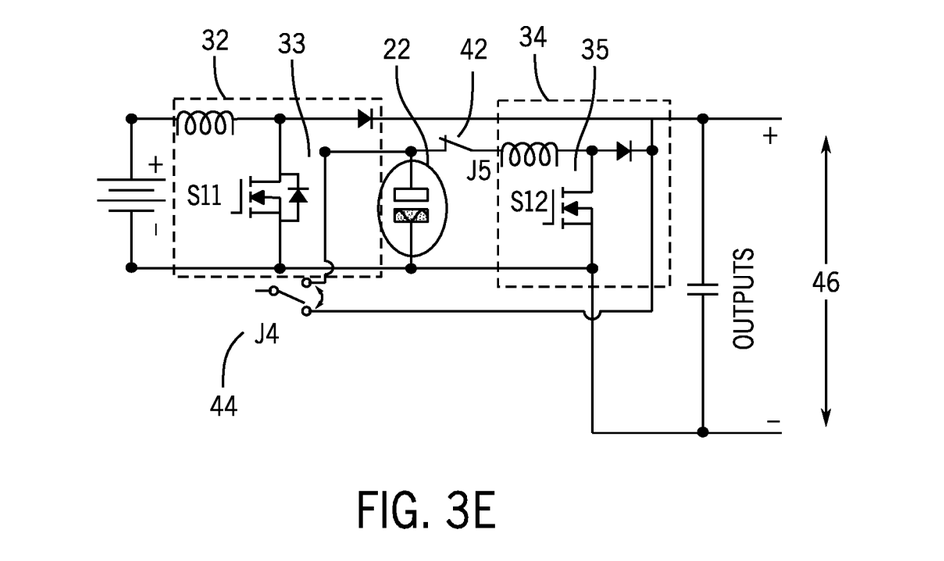
FIG. 3E is a partial schematic illustrating the HESS portion of FIG. 2.

FIG. 2 and FIG. 3E illustrate the HESS part of this MIMO converter. As described above, in the embodiment illustrated, the HESS topology includes an energy battery 20 and a SC 22, where the SC 22 is used to compensate sudden incremental changes in the load's current. In other words, the energy battery 20 feeds the load in normal operation, and when the load's current increases outside of a normal operation range, the SC 22 injects additional current to the load. The SC 22 can provide a faster response when a proportional integral (PI) controller is used for its control feedback loop.

Referring still to FIG. 3E, the energy battery 20 and the SC 22 are connected to the output through corresponding separate boost converters 32 and 34. The voltage level of the SC 22 can be nearly twice the voltage level of the energy battery 20, which is close to the output voltage. The boost converter 32 connected to the energy battery 20 operates under discontinuous current mode (DCM) which enables the energy battery 20 to follow the load's rate of change. DCM operation eliminates the effect of the right half-plane zero which provides faster response to changes and also prevents the converter from entering an unstable mode. The boost converter 34 employed to transfer the power from SC to the load operates under continuous current mode (CCM) because the SC is a current source.

Figure 4A:
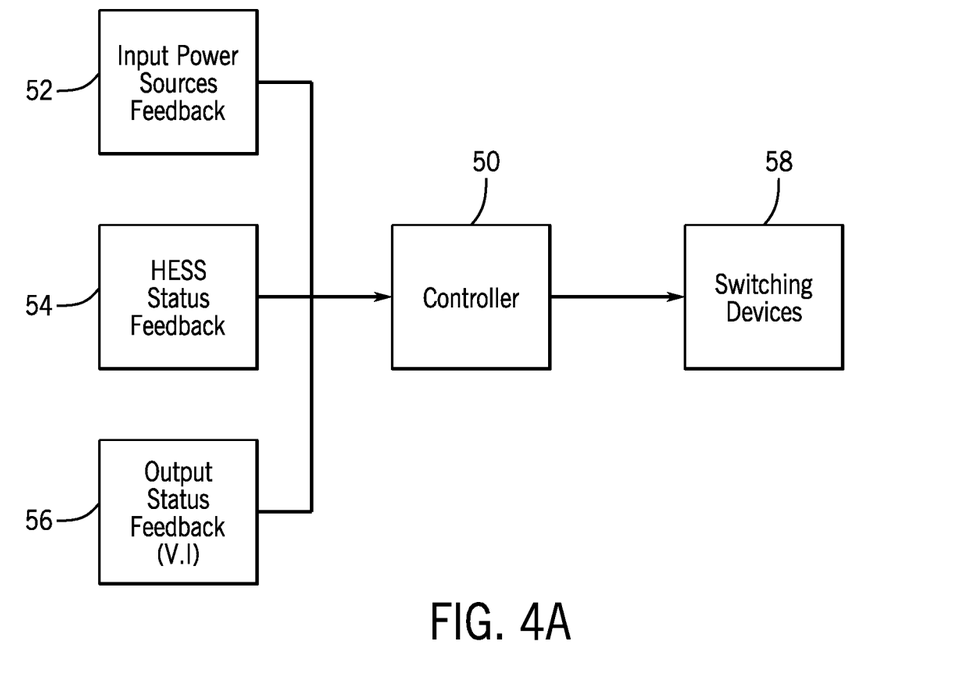
FIG. 4A is a block diagram illustrating a processor connected to monitor the inputs and outputs of the circuit of FIG. 2.

Referring again to FIG. 2 and also to FIG. 4A, the circuit includes a controller or processor 50 that is programmed to monitor input and output power levels, and the status of the storage elements in the circuit. The processor 50 can monitor current, voltage, and power levels of the inputs (photovoltaic 16, fuel cell 14, and charger 12; block 52), the status of the HESS (state of charge of the battery 20 and voltage of the super capacitor 22; block 54), and the load demand power at the output 46; block 56. The processor 50 controls the switches in each of the boost converters 24, 32, and 34, the flyback converter 25, the H-bridge inverter 28, the half-bridge switched converters 30, 31, and path control switches 36, 38, 40, 42, and 44 which can be, for example, contacts controlled by switches including relays (block 58).

Figure 4B:
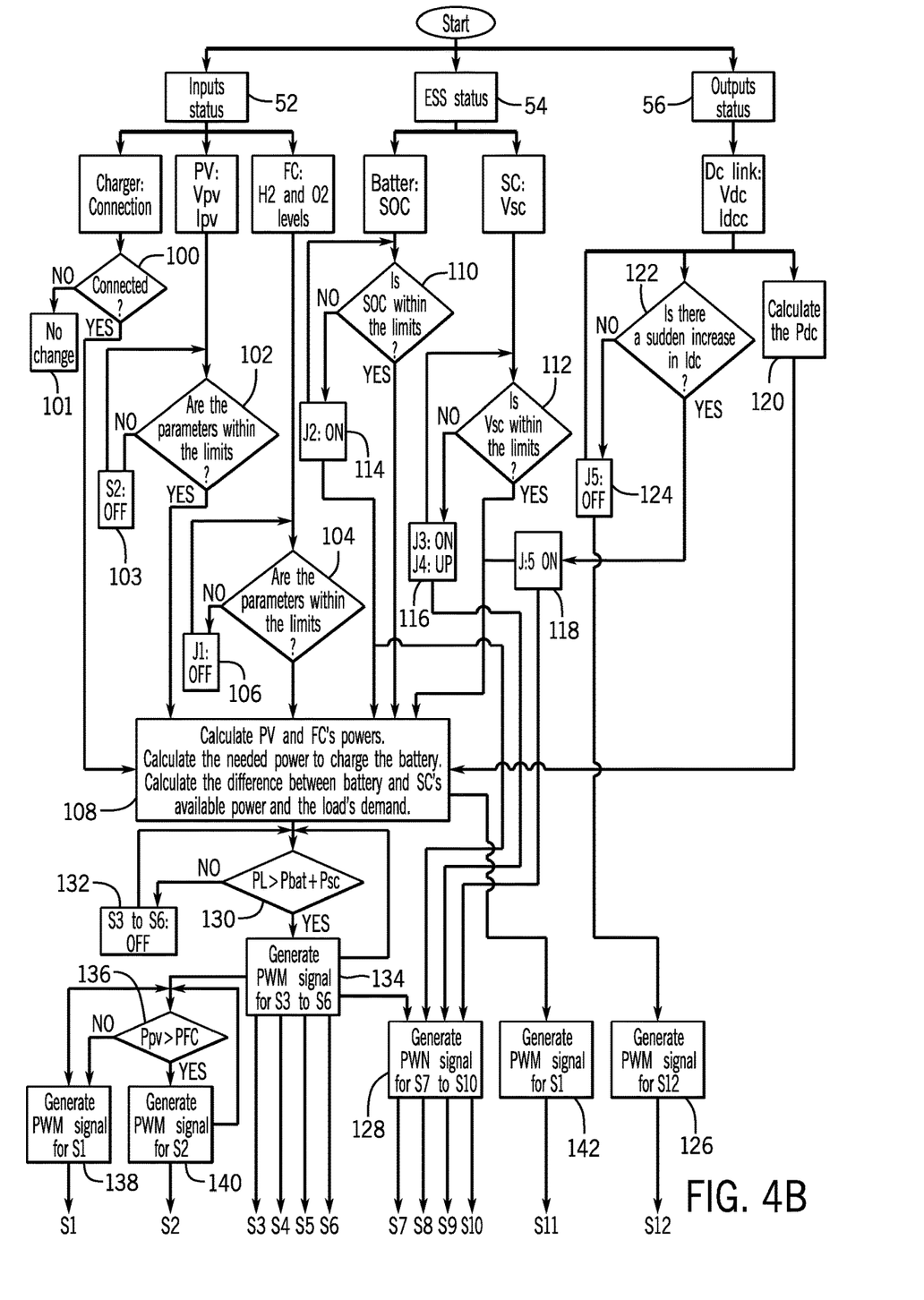
FIG. 4B is a flow chart illustrating control of the switches of FIG. 2 and corresponding calculations performed by processor 50.

A flow chart illustrating control of the switches and corresponding calculations by processor 50 is provided in FIG. 4B. As illustrated in FIGS. 4A and 4B, and described above, the processor 50 monitors outputs 56, including the demand at the load, as well as inputs 52, including available power at the inputs 14, 16, and 18. To assure proper operation of energy sources such as PV and FC devices, the processor 50 may also monitor environmental factors such as temperatures, and fuel levels. The processor further monitors the status 54 of energy storage elements, including a battery storage state of charge, and a voltage at the SC. Again, environmental factors such as temperatures may also be monitored. Based on the monitored parameters, the status of the switches in the circuit are evaluated to determine a path for power flow. Typically, the power flow path is through the battery 20, but the SC 22 or other energy sources can be used to compensate if there is a sudden increase in demand, or if the battery 20 is no longer functional. Energy from the inputs can also be used to charge the ESS's in the HESS. Decisions regarding which inputs and sources are used can be made by calculating the produced and demand powers, as well as states of charge. Reference signals are then produced, and gate signals for switches are generated. The controller 50 also assures that output voltages of the active ports 12, 14, and 16 are substantially equal, within 5% or less. These steps are described more fully below.

Referring still to FIGS. 2, 4A and 4B, when a charger is connected to the circuit (block 100), a signal is provided to the calculation block 108, which performs calculations of available power, as illustrated by calculation block 108. Health of the input sources may also be analyzed by evaluating input power supplies such as fuel levels, and environmental conditions, such as temperature. These factors will vary depending on the type of power sources that are used to provide input power. Look-up tables and other stored data may be used to provide information about connected power sources, predetermined operation limits, or other data to minimize calculation times.

If the voltage and current of the PV 16 is within predetermined limits (block 102), and the other factors indicate the input power sources are ready for use, a signal is provided to the block 108 and the power produced by the PV is calculated by the processor in block 108. If the PV is not within the predetermined limits, switch 27 is turned off to remove the PV from the charging circuit (block 103). Similarly, if the voltage and current produced by the fuel cell 14 is within predetermined limits (block 104), a signal is provided to the block 108, and the power produced by the FC is calculated in block 108. If the FC is not within the predetermined limits, and input path control switch 36 is turned off, and the FC is removed from the charging circuit. (block 106)

Referring still to FIGS. 2, 4A and 4B, the processor 50 also compares the state of charge of the battery 20 to predetermined limits (block 110) and, when the state of charge is not within predetermined limits, battery charging path control switch 38 is activated (block 114) to switch the half bridge circuit 31, enabling charging of the battery 20. When the battery 20 is within predetermined limits, a signal is provided to calculation block 108, enabling calculation of the battery power. The voltage on the super capacitor 22 is also compared to predetermined limits (block 112). If the super capacitor 22 is not within the limits, super capacitor path control switch 40 and output path control switch 44 are activated to connect the super capacitor 22 to the half bridge 30 (block 116), enabling charging of the super capacitor 22. Again, when the super capacitor 22 is within limits, a signal is provided to calculation block 108, providing available power to the SC 22. Environmental factors may also be taken into account when evaluating the status of the battery 20 and SC 22.

Referring still to FIGS. 2, 4A and 4B, the processor 50 can also monitor the voltage and current draw at the output 46 of the circuit, calculate the power draw (block 120), and provide a signal to the calculation block 108 for calculating the difference between battery 20 and SC 22 power and the demand of the load at output 46. If there is a sudden increase in current draw at the load (block 122), and the voltage of the super capacitor 22 is within the predetermined limits (block 112), super capacitor output path control switch 42 is activated, connecting the boost converter 34 to the super capacitor 22 and the super capacitor to the output 46, and a PWM signal is generated driving the switch 35 in boost converter 34 (block 126), providing power from the SC 22 to the output 46. The status of each of the switches 38, 40, 42 and 44 can be analyzed to determine whether to generate a PWM signal for each of the switches in the half bridge converters 30 and 31 (block 128).

Referring still to FIGS. 2, 4A, and 4B, as described above, the calculation block 108 calculates the power levels of the FC 14, the PV 16, the power needed to charge the battery, the available power at the battery 20 and SC 22, and the difference between the power at the battery 20 and the SC 22. After the power levels are determined, the processor evaluates whether the power required by the load at the output 46 of the circuit is greater than the power produced by battery 20 and the power at super capacitor 22 (block 130). If not, the inverter 28 is turned off by deactivating the inverter switches (block 132). If the power required by the load exceeds the power produced by battery 20 and the power at super capacitor 22, the processor drives the switches in the inverter 28 (block 134). When the inverter is active, a signal is provided to block 128 to drive the half bridge circuits 30 and 31 (block 128), and a signal is provided to comparator 136, which generates a PWM signal to drive the switch 25 in the boost converter 24 when the power of the FC 14 is greater than the power of the PV 16, and the switch 27 in the flyback converter 26 when the power of the PV 16 exceeds the power of the FC 14. Here, the system can identify which of the sources PV 16 and FC 14 should feed the load or charge the HESS. Thus, for example, the controller can elect to use the FC 14 to provide power when the power on the PV is low due to low light conditions. Block 108 provides a PWM signal to switch 33 in the boost convertor 32 corresponding to the battery 20 connecting the battery 20 to the load whenever the load is demanding current. Switch 33 is deactivated when the load is disconnected, and the battery 20 is being charged.

Figure 6A:
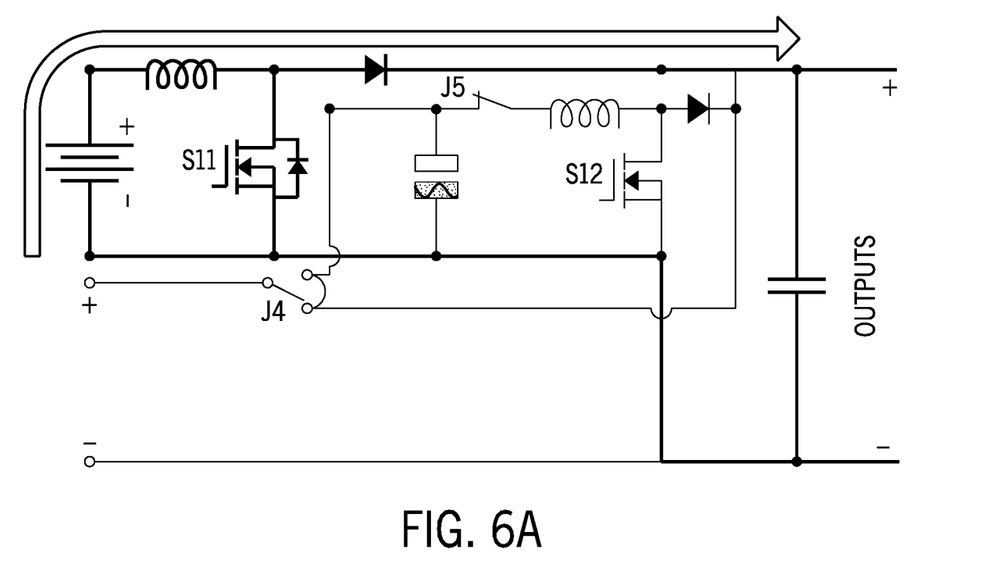
FIG. 6A illustrates a first mode of operation of the HESS in which power is supplied to the output from a battery.
Figure 6B:
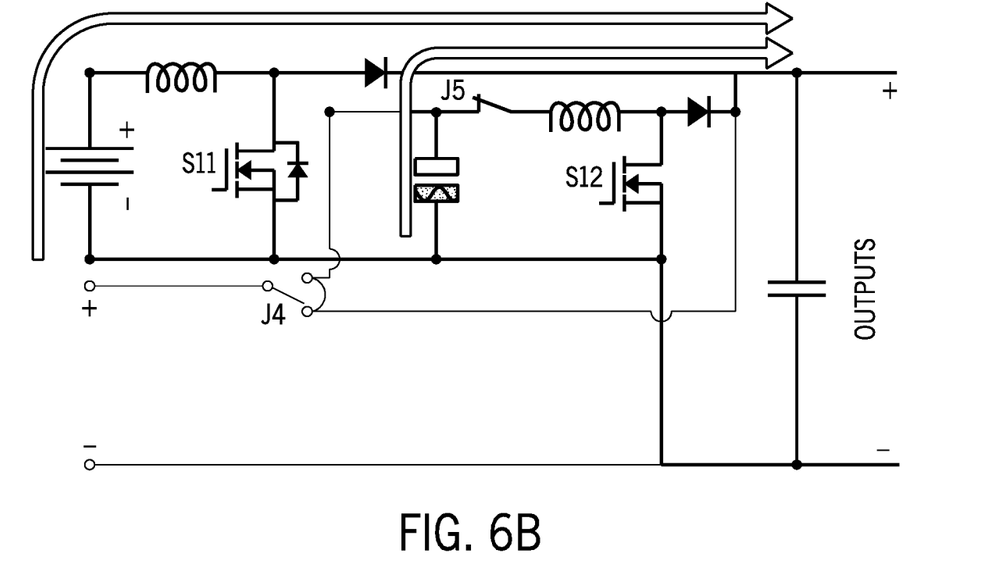
FIG. 6B illustrates a second mode of operation in which additional power is provided by a supercapacitor.
Figure 6C:
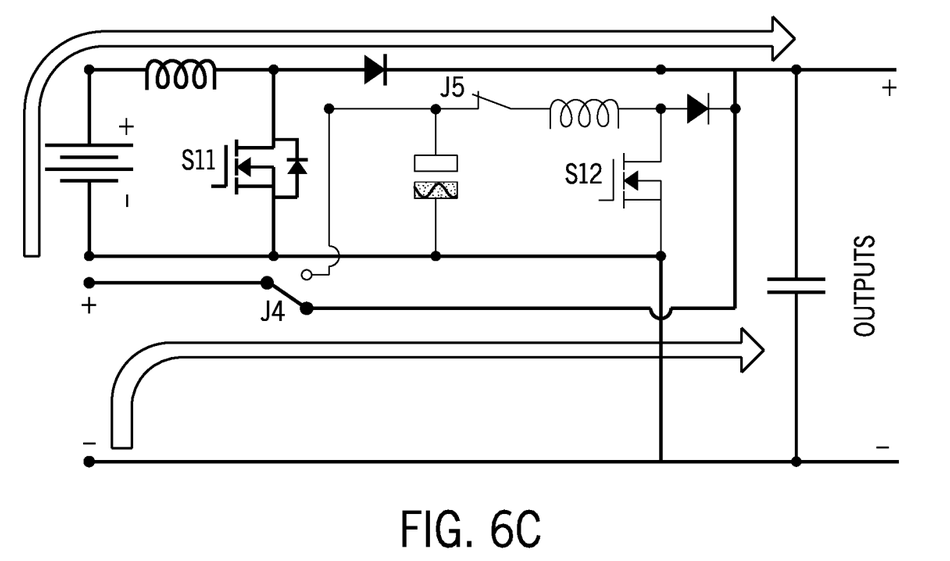
FIG. 6C illustrates a third mode of operation in which power from the inputs is directed to the output to compensate for the additional load.
Figure 6D:
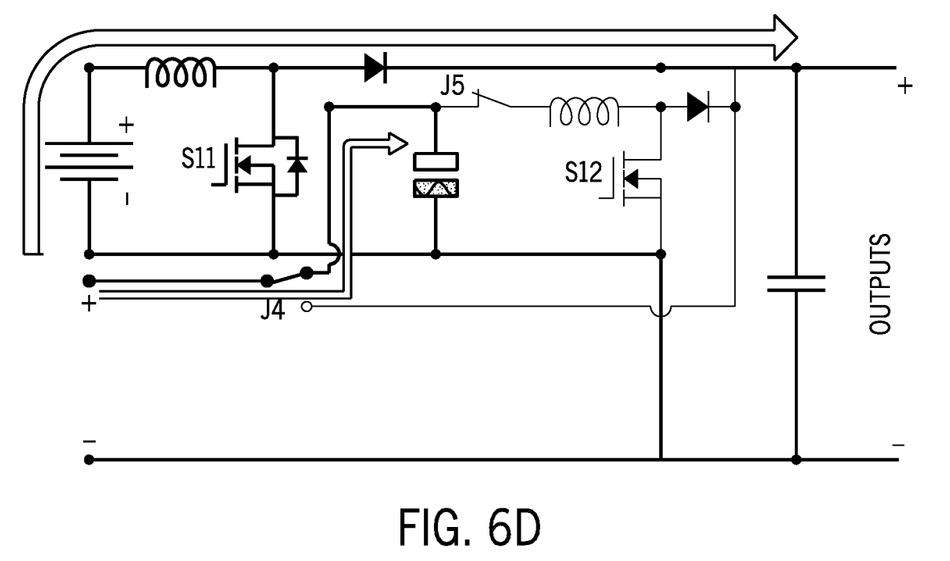
FIG. 6D illustrates a fourth mode of operation in which current is provided from a half bridge convertor 30 to a supercapacitor while a battery feeds a load.
Figure 6E:
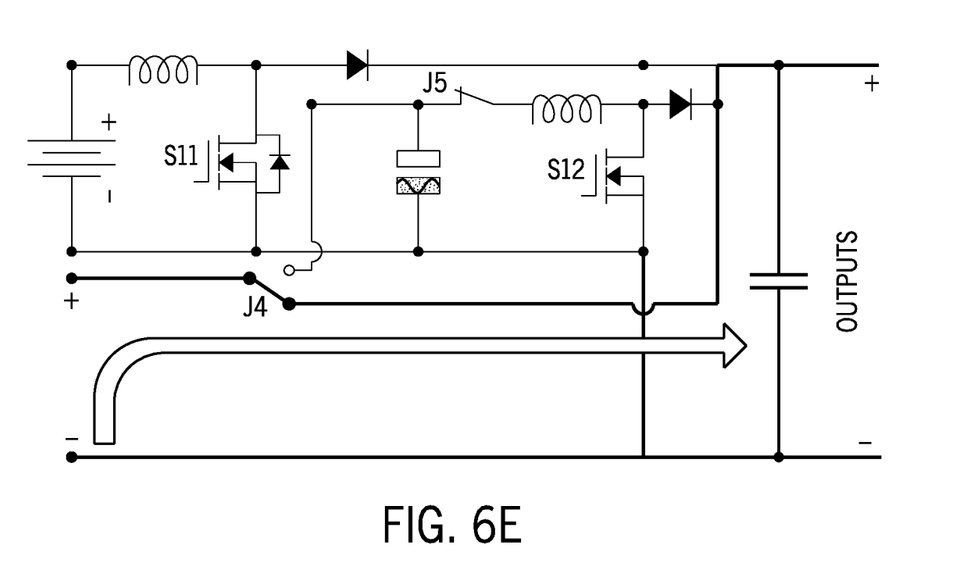
FIG. 6E illustrates a fifth mode of operation in which a battery is no longer functional, and power is provided directly from the half bridge to the load.

FIG. 6A—6E illustrate five common modes of operation of the HESS. As described above, the HESS typically operates in the mode of FIG. 6A. Here, power is supplied to the output 46 from battery 20. In the case of an upsurge in the demand for current at the output 46, additional power can be provided by the SC 22, by activating the switch 42, as illustrated in FIG. 6B. Here, the SC 22 compensates for the load's surplus current. If the load requires higher current for longer than SC 22 can provide the supply, the HESS is switched to the mode illustrated in FIG. 6C. Here, switch 44 is activated, and power rectified from inputs 12, 14, and 16 can be directed to the output 46, such that the inputs compensate for the additional load. In order to keep the SC 22 functional, the mode illustrated in FIG. 6D can be activated. Here the position of switch 44 is changed to provide current from the half bridge convertor 30 to the SC 22. In this mode, the SC 22 is charged while battery 20 keeps feeding the load 46. In the situation where the battery 20 is no longer functional, the position of switch 44 can be adjusted to provide power directly from the half bridge 30 to the load 46, as illustrated in FIG. 6E. This mode may be entered, for example, when the SOC of the battery 20 is below a limit that prohibits this ESS from feeding the load 46, or a fault in the battery 20 or associated circuitry disconnects the battery 20 from the rest of the MPC the system. Although five specific modes are illustrated here, various other modes of operation can also be used including, for example, a mode in which the battery 20 is charged, and a mode in which both the battery 20 and SC 22 are charged.

The following equations provide decoupled transfer functions between the output 46 ($V_{out}$) and each of the input ports: first input 12 ($V_1$), second input port 14 ($V_2$), and third input port 16 ($V_3$):

$$V_{out} = \frac{N_5}{D_9 \cdot N_3} \times V_{in1} \quad (1)$$

$$V_{out} = \frac{N_5}{(1-D_1) \cdot D_9 \cdot N_3} \times V_{in2} \quad (2)$$

$$V_{out} = \frac{D_2 \cdot N_2 \cdot N_5}{(1-D_2) \cdot D_9 \cdot N_1 N_3} \times V_{in3} \quad (3)$$

Here, and in the equations below, $D_1$-$D_9$ are the duty cycle of the corresponding switches $S_1$-$S_9$, corresponding to switches 25, 27, and each of the switches in the H-bridge converter 28 and half bridge switched convertor 30.

The following equations also provide decoupled transfer functions between output 46 and the battery 20 ($V_{batt}$) and SC 22 ($V_{SC}$) in the HESS. In the equations below, $N_1$ and $N_2$ represent the turns at the primary and secondary of the transformer in flyback convertor 26, respectively, $N_3$ represented the turns at the primary side of the HF transformer 18, and $N_4$ and $N_5$ represent the turns in the respective secondary windings of the HF transformer 18.

$$V_{out} = \frac{1}{(1-D_{11})} \times V_{Batt} \quad (4)$$

$$V_{out} = \frac{1}{(1-D_{12})} \times V_{SC} \quad (5)$$

The following equations describe the transfer functions between the inputs ($V_1$), ($V_2$), ($V_3$) and the battery 20 ($V_{batt}$)

$$V_{Batt} = \frac{N_4}{N_3 \cdot D_7} \times V_{in1} \quad (6)$$

$$V_{Batt} = \frac{N_4}{N_3 \cdot D_7 \cdot (1-D_1)} \times V_{in2} \quad (7)$$

$$V_{Batt} = \frac{D_2 \cdot N_2 \cdot N_4}{(1-D_1) \cdot D_7 \cdot N_1 \cdot N_3} \times V_{in3} \quad (8)$$

The circuit described above provides significant improvements over the prior art conventional technology described with reference to FIG. 5. The MPC is suitable for use with a wide range of DC sources, and is flexible for variable sources such as fuel cells. The HESS and outputs provide a level of immunity against faults in the inputs and vice versa. A direct path can be provided from the inputs to the outputs through galvanic isolation. The charged battery 20 can typically feed the load continuously, while the SC 22 can compensate for surge conditions. Various loads can be connected to the output, either directly or through convertors. Additionally, the circuit described above significantly reduces the number of components as compared to the prior art circuit, as illustrated in Table 1 below:

TABLE 1

Benefits of Disclosed Circuit as Compared to Conventional Circuitry

| Parameter | Disclosed System | Conventional |
|---|---|---|
| Number of active switches | 12 | 21 |
| Number of independent Diodes | 4 | 3 |
| Number of HF transformers | 1 SISO, 1 SIDO | 3 SISO |
| Number of relays | 5 | 5 |
| Number of Passive components | 10 | 13 |

As can be seen here, the number of active switches, transformers, relays, and passive components are all reduced when the circuit is constructed as described with reference to FIG. 2 and FIGS. 3A-E, above.

Additionally, the multipurpose HESS described above empowers the MPC to have a main battery system 10-30% smaller as compared to prior art devices, depending on the system/application and the load profile. Furthermore, the presence of a secondary ESS, such as the SC 22 described above, increases the life of the primary ESS, battery 20, by reducing the stresses caused by dynamic loads. The described system also provides a path for inputs to bypass the ESSs in case of a fault or an overload.

Although preferred embodiments have been shown and described, it will be apparent that various modifications can be made to the features described above. For example, although a HESS including a battery and a supercapacitor is illustrated and described above, various types of energy and power storage elements, including various types of batteries and capacitors, can be used to provide the HESS. Any combination of energy storage systems can be used. The HESS is particularly advantageous when the characteristics of the energy storage systems are different. Here, different characteristics refer to the capabilities of the ESSs in storage vs releasing the stored energy. The former type are referred to as energy batteries and the latter are called power batteries. This concept is not binary, and there are various ESSs in the middle of that spectrum which can be used in this HESS topology as well. The system can, for example, combine an energy battery with a power battery, and in more general terms, an energy-type storage with power-type storage.

Further, the type and the number of inputs in the proposed topology are exemplary, and can be changed or expanded. Therefore, different energy sources can be applied in addition to or instead of a charger/grid, FC, or PV described above. Also, if an application requires more or less input power, the number of input ports can increased or decreased, depending on the application.

The proposed MPC can feed any type of load, including, for example, a DC bus bar, a DC load, or by using an inverter, an AC load, or the grid.

Various other modifications will be apparent to those of ordinary skill in the art.

We claim:

1. A multiport convertor comprising:
a direct current (DC) processing circuit including an inverter for converting input power to an alternating current (AC) pulse train;
a plurality of power sources, at least one of the plurality of power sources being a renewable energy power source, the plurality of power sources being selectively connectable to an input of the DC processing circuit;
a high frequency transformer having a single primary winding and at least first and second secondary windings, the high frequency transformer connected to receive the AC pulse train;
a first and a second rectifier circuit selectively connected to the first and second windings, respectively;
a first energy storage system selectively connected to an output of the first rectifier circuit;
a second energy storage system selectively connected to an output of the second rectifier circuit;
a load output selectively connected to one of the first energy storage system, the second energy storage system, or an output of at least one of the first and second rectifier circuits,
a controller programmed to:
monitor a power level of each of the plurality of input power sources, a state of charge of the first and second energy storage devices, and a demand at the load output;
based on the monitored power level, selectively connect at least one of the plurality of input power sources to the DC processing;
based on the state of charge of each of the first energy storage system, selectively connect the first energy storage system to the first rectifier circuit to charge the first energy storage system;
based on the state of charge of the second energy storage system, selectively connect the second energy storage system to the second rectifier circuit to charge the second energy storage system
based on the monitored demand of the load, selectively switch an output of the first energy storage system and/or the second energy storage system, or an output of at least one of the first and second rectifiers, to the load output, wherein power is supplied to the load output by at least one of the first and second energy storage systems or directly from one of the first and second rectifiers.

2. The multi-port circuit of convertor 1, wherein at least one of the plurality of power sources is an AC power grid, the power source including a rectifier circuit for rectifying the AC power to DC.

3. The multi-port circuit of convertor 1, wherein at least one of the plurality of power sources includes a fuel cell and a boost circuit operated in a continuous current mode.

4. The multi-port convertor of claim 1, wherein at least one of the plurality of power sources includes a photovoltaic power supply and a flyback convertor.

5. The multiport convertor of claim 4, wherein the flyback convertor provides galvanic isolation for the photovoltaic.

6. The multiport convertor of claim 1, wherein at least one of the first and second energy storage systems comprises an energy battery.

7. The multiport convertor of claim 1, wherein at least one of the first and second energy storage systems comprises a super capacitor or a power battery.

8. The multiport convertor of claim 1, wherein at least one of the first and second energy storage systems is connected to a boost circuit.

9. The multiport convertor of claim 1, wherein at least one of the first and second energy storage systems is a primary energy storage system that is connected to the output load in a normal mode of operation.

10. The multiport convertor of claim 9, wherein the other of the at least one of the first and second energy storage systems is a secondary energy storage system, and the controller is programmed to connect the secondary energy storage system to the output load to supply the demand when monitoring detects a surge in the demand at the output load.

11. The multiport convertor of claim 1, wherein the controller is programmed to provide power to the output load from at least one of the first and second rectifiers when the state of charge of the first and second energy systems is insufficient to supply the demand at the output load.

12. The multiport convertor of claim 1, wherein at least one of the input ports is connected to a charger.

13. The multiport convertor of claim 1, wherein the controller is further programmed to monitor environmental conditions and to determine available output power based on the environmental conditions.

14. The multiport convertor of claim 13, wherein at least one of the environmental conditions is a temperature.

15. The multiport converter of claim 1, wherein the controller is programmed to simultaneously supply current from at least one of the first and second energy storage systems while charging the other of the first and second energy storage systems.

16. The multiport converter of claim 1, wherein the controller is programmed to simultaneously supply power to the load from at least one of the first and second energy storage systems and directly from an output of at least one of the first and second rectifier circuits.

17. The multiport convertor of claim 1, wherein the controller is programmed to provide power to the load output from at least one of the first energy storage system, the second energy storage system, and at least one of the first and second rectifier circuits.

18. The multiport convertor of claim 1, wherein the controller is programmed to selectively switch power to the load output solely from one of the first and second rectifier circuits.

19. The multiport convertor of claim 1, wherein the first and second energy storage systems are selected to have different charge and discharge characteristics.

20. The multiport convertor of claim 1, wherein the turns ratio between the primary winding and the first and second secondary windings is selected to boost the voltage level from the input to match a requirement of each of the first and second energy storage systems.

21. The multiport convertor of claim 1, wherein the turns ratio between the primary winding and the first and second secondary windings is selected to provide corresponding first and second voltage levels, the first voltage level for charging the first and second energy storage systems, and the second level for supplying voltage to the load output.

* * * * *